United States Patent
Frey et al.

(10) Patent No.: US 12,028,708 B2
(45) Date of Patent: Jul. 2, 2024

(54) METHOD AND SYSTEM FOR AUTHORIZING THE COMMUNICATION OF A NETWORK NODE

(71) Applicant: Siemens Schweiz AG, Zürich (CH)

(72) Inventors: Christian Frey, Unterägeri (CH); Hilmar Konrad, Baar (CH)

(73) Assignee: SIEMENS SCHWEIZ AG, Zurich (CH)

( * ) Notice: Subject to any disclaimer, the term of this patent is extended or adjusted under 35 U.S.C. 154(b) by 903 days.

(21) Appl. No.: 16/982,719

(22) PCT Filed: Feb. 27, 2019

(86) PCT No.: PCT/EP2019/054917
§ 371 (c)(1),
(2) Date: Sep. 21, 2020

(87) PCT Pub. No.: WO2019/179739
PCT Pub. Date: Sep. 26, 2019

(65) Prior Publication Data
US 2021/0099878 A1    Apr. 1, 2021

(30) Foreign Application Priority Data
Mar. 22, 2018  (DE) ............ 10 2018 204 367.1

(51) Int. Cl.
*H04W 12/08*    (2021.01)
*H04B 5/72*     (2024.01)
(Continued)

(52) U.S. Cl.
CPC .............. *H04W 12/08* (2013.01); *H04B 5/72* (2024.01); *H04W 4/80* (2018.02); *H04W 12/63* (2021.01)

(58) Field of Classification Search
CPC ....... H04W 12/08; H04W 4/80; H04W 12/63; H04B 5/0031; H04B 5/72
(Continued)

(56) References Cited

U.S. PATENT DOCUMENTS 9,016,562 B1 *  4/2015  Tredoux ............. G06K 7/10792
                                                          235/487
9,460,573 B1 * 10/2016  Cordes ..................... G07C 9/21
(Continued)

FOREIGN PATENT DOCUMENTS

| CN | 104717225 A | 6/2015 | ............ H04L 29/06 |
| CN | 104 936 266 | 9/2015 | ............ H04W 48/18 |

(Continued)

OTHER PUBLICATIONS

Search Report for International Application No. PCT/EP2019/054844, 13 pages, May 28, 2019.
(Continued)

*Primary Examiner* — Thanh T Le
(74) *Attorney, Agent, or Firm* — Slayden Grubert Beard PLLC (57) ABSTRACT

Method and system for authorizing the communication of a network node of a communication network, wherein the communication of the network node is only permitted if the network node receives an authorization after a completed NFC connection with a defined (certified) mobile communication terminal.

10 Claims, 3 Drawing Sheets

(51) Int. Cl.
*H04W 4/80* (2018.01)
*H04W 12/63* (2021.01)

(58) Field of Classification Search
USPC .............................................................. 726/4
See application file for complete search history.

(56) References Cited

U.S. PATENT DOCUMENTS

| | | | |
|---|---|---|---|
| 9,699,659 B2 | 7/2017 | Zehavi et al. | |
| 2012/0198086 A1* | 8/2012 | Miyabayashi | G06Q 30/02 726/4 |
| 2013/0054033 A1 | 2/2013 | Casilli | 700/276 |
| 2014/0189808 A1* | 7/2014 | Mahaffey | G06F 21/6245 726/4 |
| 2015/0046969 A1* | 2/2015 | Abuelsaad | G06F 21/6218 726/1 |
| 2015/0187152 A1* | 7/2015 | Matsushima | G07C 9/28 340/5.61 |
| 2015/0222615 A1* | 8/2015 | Allain | H04L 67/55 726/4 |
| 2015/0350913 A1* | 12/2015 | Eberwine | H04W 12/041 455/411 |
| 2016/0019738 A1* | 1/2016 | Kim | G07C 9/00182 340/5.22 |
| 2016/0165570 A1 | 6/2016 | Kim | H04W 64/003 |
| 2016/0295349 A1* | 10/2016 | George | H04W 4/80 |
| 2016/0323283 A1 | 11/2016 | Kang | H04L 63/10 |
| 2016/0344559 A1 | 11/2016 | Ma | H04L 9/3263 |
| 2017/0034700 A1 | 2/2017 | Cohen et al. | 713/156 |
| 2017/0171204 A1 | 6/2017 | Forood | H04L 63/10 |
| 2017/0289901 A1 | 10/2017 | Kim et al. | |
| 2017/0295447 A1 | 10/2017 | Tegegne | H04W 4/001 |
| 2018/0041951 A1 | 2/2018 | Kim | H04W 48/16 |
| 2018/0063681 A1 | 3/2018 | Mankovskii | H04W 4/043 |
| 2018/0077576 A1* | 3/2018 | Ngo | H04W 76/11 |
| 2018/0300991 A1* | 10/2018 | Park | G06Q 20/3224 |
| 2019/0246273 A1* | 8/2019 | Zhou | H04L 63/0853 |
| 2020/0164759 A1* | 5/2020 | Heuer | B60L 53/68 |
| 2020/0202328 A1* | 6/2020 | Li | G06Q 20/3829 |

FOREIGN PATENT DOCUMENTS

| | | | | |
|---|---|---|---|---|
| CN | 106576244 A | 4/2017 | ............ | H04W 12/08 |
| CN | 107 613 544 | 1/2018 | ............ | H04W 48/16 |
| WO | 2016 183261 | 11/2016 | ............ | G06F 21/34 |

OTHER PUBLICATIONS

Search Report for International Application No. PCT/EP2019/054917, 12 pages, Jun. 3, 2019.

* cited by examiner

METHOD AND SYSTEM FOR AUTHORIZING THE COMMUNICATION OF A NETWORK NODE

CROSS-REFERENCE TO RELATED APPLICATIONS

This application is a U.S. National Stage Application of International Application No. PCT/EP2019/054917 filed Feb. 27, 2019, which designates the United States of America, and claims priority to DE Application No. 10 2018 204 367.1 filed Mar. 22, 2018, the contents of which are hereby incorporated by reference in their entirety.

TECHNICAL FIELD

The present disclosure relates to network communications. Various embodiments include methods and/or systems for authorizing the communication of a network node of a communication network and network nodes of a communication network.

BACKGROUND

The networking of objects and devices among each other and with the Internet is increasingly penetrating everyday life, both in the private and also in the industrial environment. In the case of the so-called Internet of Things, IoT devices create a network in which they communicate with each other or with the Internet via suitable communication connections (e.g. WLAN). Many of the IoT devices available on the market have few or no security mechanisms at all and include to some extent various vulnerabilities and therefore represent a potential danger for their users and third parties. The number of malicious attacks on Internet-based systems, devices and applications is currently increasing dramatically.

The use of proprietary interfaces to the built-in devices by utilizing manufacturer tools such as, for example, via a service interface is known. Furthermore, the use of certificates to ensure a secure data transfer between the IoT devices and/or a control unit or service unit is known. Proprietary interfaces are inflexible and require additional tools on the part of a user. Certificates can be stolen from a certification server and misused by means of hacker attacks. This is often without the knowledge of the operator of the IoT infrastructure or of a user.

SUMMARY

The teachings of the present disclosure provide methods and systems for a user-friendly and secure access to IoT devices. For example, various embodiments include a method for authorizing the communication of a network node (IoT1-IoT4, PANEL) of a communication network (IP2), wherein the communication of the network node (IoT1-IoT4, PANEL) is only permitted if the network node (IoT1-IoT4, PANEL) receives an authorization (GRANT, $GRANT_{IDn}$) after a completed NFC connection (NFC) with a defined mobile communication terminal (SMART).

In some embodiments, the network node (IoT1-IoT4, PANEL) receives the authorization from the mobile communication terminal (SMART) prior to the communication.

In some embodiments, the network node (IoT1-IoT4, PANEL) receives the authorization (GRANT, $GRANT_{IDn}$) via a correspondingly configured cloud server (CSA) prior to the communication.

In some embodiments, following receipt of the authorization the network node (IoT1-IoT4, PANEL) requests the mobile communication terminal (SMART) via the NFC connection (NFC) to send an acknowledgment to the network node (IoT1-IoT4, PANEL).

In some embodiments, following receipt of the authorization the network node (IoT1-IoT4, PANEL) requests the mobile communication terminal (SMART) via the NFC connection (NFC) to send an acknowledgment to a certification server.

In some embodiments, the network node (IoT1-IoT4, PANEL) is in a permanent NFC connection with the mobile communication terminal during a communication.

In some embodiments, the mobile communication terminal (SMART) receives an authorization via a certification server.

In some embodiments, a communication of the network node (IoT1-IoT4, PANEL) only takes place if the mobile communication terminal (SMART) is located within a defined distance of the network node (IoT1-IoT4, PANEL).

In some embodiments, a write access to a memory (M) of the authorized network node (IoT1-IoT4, PANEL) is only permitted following a completed authorization.

As another example, some embodiments include a system for authorizing the communication of network nodes (IoT1-IoT4, PANEL) within a communication network (IP2), wherein a network node (IoT1-IoT4, PANEL) is configured in such a way that it can only carry out a communication if it receives an authorization following a completed NFC connection (NFC) with a defined mobile communication terminal (SMART).

In some embodiments, the network node (IoT1-IoT4, PANEL) is configured in such a way that it is in a permanent NFC connection (NFC) with the mobile communication terminal (SMART) for the duration of a communication.

In some embodiments, following completed authorization the network node (IoT1-IoT4, PANEL) is configured to allow a write access to a memory (M) of this authorized network node (IoT1-IoT4, PANEL).

As another example, some embodiments include a network node (IoT1-IoT4, PANEL) of a communication network (e.g. IP network), wherein the network node (IoT1-IoT4, PANEL) is configured in such a way that it can only carry out a communication if it receives an authorization following a completed NFC connection (NFC) with a defined mobile communication terminal (SMART).

In some embodiments, the network node (IoT1-IoT4, PANEL) is an IoT device.

In some embodiments, following completed authorization the network node (IoT1-IoT4, PANEL) is configured to allow a write access to a memory (M) of this authorized network node (IoT1-IoT4, PANEL).

BRIEF DESCRIPTION OF THE DRAWINGS

The teachings of the present disclosure and example embodiments thereof are explained using the example of the following figures, in which.

DETAILED DESCRIPTION

The teachings of the present disclosure include methods for authorizing the communication (e.g. data connection) of a network node (e.g. IoT device) of a communication network (e.g. IP network), wherein the communication of the network node (sending/receiving data/signals to other network nodes/to the cloud/to the smartphone) is only permitted if the network node receives an authorization after a completed NFC connection (e.g. Bluetooth, RFID) with a defined mobile communication terminal (e.g. smartphone). The mobile communication terminal may be a correspondingly certified mobile communication terminal. A communication comprises, for example, receiving or sending data, files, signals, commands, parameters to other network nodes, to a panel, to a cloud or to the mobile communication terminal. A network node (e.g. IoT device) is then only authorized to carry out a communication (e.g. a firmware update or an update of operating parameters of the IoT device) if the network node has entered into an NFC connection (near-field communication, e.g. Bluetooth, RFID) with a defined mobile communication terminal (e.g. a mobile communication terminal from a quantity of certified mobile communication terminals).

In some embodiments, authorization of the network node takes place for a communication in addition to the established NFC connection between network node and mobile communication terminal also in addition by means of a further authorization of the network node (e.g. by means of a release by a control center, an additional node in the network or by registration of the device in the IP network itself (by means of corresponding access authorization)). This two-factor verification or two-factor authorization provides a high degree of security for the access to the network node. In the case of two-factor verification or two-factor authorization an initial verification or authorization takes place by means of the IP access itself (virtual component). A second verification or authorization takes place, for example, via a physical component (e.g. by means of a PIN entry to log onto the IP network in which the network node is located). Only once the first and second verification or authorization have taken place can the data transfer be activated for the network node. The physical access to the network node (e.g. IoT device in a building) is ensured by means of an access control system. This would facilitate or represent a three-factor verification or three-factor authorization.

In some embodiments, the methods are used for the installation and/or maintenance of network nodes in a building or within a building automation. Network nodes can be, for example, IoT devices, or hazard detectors and/or fire detectors, controllers for sensors and/or actuators, actuating drives or bus subscribers of an installation bus (e.g. KNX bus). The access to the network node (e.g. IoT device) is only then released if a direct data communication between the network node and a mobile communication terminal (e.g. smartphone) is possible in the immediate vicinity (e.g. at a defined maximum distance of approx. 2 to 3 m in the radius of the network node), such as for example by means of NFC or Bluetooth. If spatial proximity is determined, the access is released so that the device can deposit external data in the secured storage area via the server or via the cloud. In some embodiments, the external data can also be transferred directly from the mobile communication terminal to the network node by means of NFC or Bluetooth.

In order to increase security, a request may be transferred to a cloud (cloud server or cloud service application) to load external data in encrypted form to the corresponding network node. The corresponding network node then only releases the secured storage area if the encrypted request is valid and in addition the corresponding network node is in a communication connection with the mobile communication terminal. The external data can then be transferred directly from the mobile communication terminal to the network node or via the cloud.

In some embodiments, a near-field communication (NFC) can be established between the mobile communication terminal and the network node for example via RFID (radio frequency identification) or via Bluetooth. A near-field communication requires both of the devices which are to be connected to be spatially close to one another (e.g. 2-3 m). If the mobile communication terminal and the network node have an NFC connection installed between them, this can be seen as evidence that their respective geographical position largely corresponds (e.g. at a distance of 2-3 m).

In some embodiments, the network node receives the authorization from the mobile communication terminal prior to the communication. Once an NFC connection has been completed between the network node and the mobile communication terminal, the mobile communication terminal can send an authorization message, an authorization signal or an authorization code (e.g. four-digit or six-digit PIN) to the network node. This may take place via the established NFC connection. The authorization from the mobile communication terminal to the network node can however in principle also take place via an alternative communication path (e.g. via the IP network of the network node).

In some embodiments, the network node receives the authorization via a correspondingly configured cloud server or a corresponding cloud service application prior to the communication. The cloud server or the cloud service application is requested by the mobile communication terminal by means of a corresponding communication connection (e.g. IP connection) to send an authorization (e.g. an authorization message or an authorization signal) to the corresponding network node. This further increases the security.

In some embodiments, following receipt of the authorization the network node requests the mobile communication terminal via the NFC connection to send an acknowledgment to the network node. This ensures additional data security.

In some embodiments, following receipt of the authorization the network node requests the mobile communication terminal via the NFC connection to send an acknowledgment to a certification server. This also ensures additional data security.

In some embodiments, the network node is in a permanent NFC connection with the mobile communication terminal during a communication. This increases further the security of the access to the network node and the security of the communication with the network node. The mobile communication terminal must, for example, be connected to the corresponding network node via an NFC connection for the entire duration of a firmware update.

In some embodiments, the mobile communication terminal receives an authorization (token, certificate; in fact authorization for authorization) from a certification server (e.g. trustworthy server). For example, a certification server can generate digital certificates by means of a suitable asymmetric encryption method and transfer said certificates to mobile communication terminals. A digital certificate may be valid only for a specific time period and/or for a defined number of authorizations and/or for defined network nodes (e.g. network nodes in a particular area of the building (e.g. a particular room). This increases further the security of the access to the network node and the security of the communication with the network node.

In some embodiments, a communication of the network node only takes place if the mobile communication terminal is located within a defined distance (e.g. maximum distance 3-4 m, in particular 2 m) of the network node. The geographical position of the network node can for example be stored in a building information model (BIM) in a correspondingly configured database. The geographical position of the mobile communication model can for example be determined by means of a positioning system (satellite-driven (e.g. GPS) or by means of an indoor positioning system (IPS, e.g. based on BLE (Bluetooth Low Energy Beacons)). Determining the distance and the authorization for communication can take place for example in the mobile communication terminal or in a cloud application. This increases further the security of the access to the network node and the security of the communication with the network node.

In some embodiments, a write access to a memory of the authorized network node (e.g. via further network nodes or via the mobile communication terminal) is only permitted following a completed authorization. The write access can take place for example via further network nodes, via the mobile communication terminal or via a server. The server may be located in a cloud infrastructure and is suitably configured for a communication with the network node.

In some embodiments, there is a system for authorizing the communication of network nodes (e.g. IoT device) within a communication network (e.g. IP network), wherein a network node is configured in such a way that it can only carry out a communication if it receives an authorization following a completed NFC connection with a defined (certified) mobile communication terminal (e.g. smartphone). The mobile communication terminal may be a correspondingly certified mobile communication terminal. A communication comprises, for example, receiving or sending data, files, signals, commands, parameters to other network nodes, to a panel, to a cloud or to the mobile communication terminal. A network node (e.g. IoT device) is then only authorized to carry out a communication (e.g. a firmware update or an update of operating parameters of the IoT device) if the network node has entered into an NFC connection (near-field communication, e.g. Bluetooth, RFID) with a defined mobile communication terminal (e.g. a mobile communication terminal from a quantity of certified mobile communication terminals).

In some embodiments, an authorization of the network node takes place for a communication in addition to the established NFC connection between network node and mobile communication terminal also in addition by means of a further authorization of the network node (e.g. by means of a release by a control center, an additional node in the network or by registration of the device in the IP network itself (by means of corresponding access authorization)). This two-factor verification or two-factor authorization provides a high degree of security for the access to the network node. In the case of two-factor verification or two-factor authorization, an initial verification or authorization takes place by means of the IP access itself (virtual component). A second verification or authorization takes place, for example, via a physical component (e.g. by means of a PIN entry to log onto the IP network in which the network node is located). Only once the first and second verification or authorization have taken place can the data transfer be activated for the network node. The physical access to the network node (e.g. IoT device in a building) may be ensured by means of an access control system. This would facilitate or represent a three-factor verification or three-factor authorization.

In some embodiments, the access to the network node (e.g. IoT device) is only then released if a direct data communication between the network node and a mobile communication terminal (e.g. smartphone) is possible in the immediate vicinity (e.g. at a defined maximum distance of approx. 2 to 3 m in the radius of the network node), such as for example by means of NFC or Bluetooth. If spatial proximity is determined, the access is released so that the device can deposit external data in the secured storage area via the server or via the cloud. In some embodiments, the external data can also be transferred directly from the mobile communication terminal to the network node by means of NFC or Bluetooth.

In order to increase security, a request may be transferred to a cloud (cloud server or cloud service application) to load external data in encrypted form to the corresponding network node. The corresponding network node then only releases the secured storage area if the encrypted request is valid and in addition the corresponding network node is in a communication connection with the mobile communication terminal. The external data can then be transferred directly from the mobile communication terminal to the network node or via the cloud.

A near-field communication (NFC) can be established between the mobile communication terminal and the network node for example via RFID (radio frequency identification) or via Bluetooth. A near-field communication requires both of the devices which are to be connected to be spatially close to one another (e.g. 2-3 m). If the mobile communication terminal and the network node have an NFC connection installed between them, this can be seen as evidence that their respective geographical position largely corresponds (e.g. at a distance of 2-3 m).

The systems described herein can be realized with infrastructure which already exists anyway in a building. Network nodes can be, for example, IoT devices, or hazard detectors and/or fire detectors, controllers for sensors and/or actuators, or bus subscribers of an installation bus (e.g. KNX bus).

In some embodiments, the network node is configured in such a way that it is in a permanent NFC connection with the mobile communication terminal for the duration of a communication. Among other things this increases the security for the duration of a communication (e.g. data transfer).

In some embodiments, following the completed authorization the network node is configured to allow a write access to a memory of this authorized network node (e.g. via further network nodes, via a cloud server or via the mobile communication terminal). This ensures, among other things, an increased protection against hacker attacks or man-in-the-middle attacks (MITM attack) on the network node.

In some embodiments, there is a network node of a communication network (e.g. IP network), wherein the network node is configured in such a way that it can only carry out a communication if it receives an authorization following a completed NFC connection with a defined, certified mobile communication terminal (e.g. smartphone). Network nodes configured in this way have a high protection against unauthorized access. Network nodes can be, for example, IoT devices, or hazard detectors and/or fire detectors, controllers for sensors and/or actuators, or bus subscribers of an installation bus (e.g. KNX bus).

In some embodiments, the network node is an IoT device. An IoT device (IoT stands for Internet of Things) is physical and/or virtual objects which are connected to one another and/or to the Internet. IoT devices can have different performance capabilities depending on the specification (hardware, software, processor, memory).

In some embodiments, following the completed authorization the network node is configured to allow a write access to a memory of this authorized network node (e.g. via further network nodes, via a cloud server or via the mobile communication terminal). This ensures, among other things, an increased protection against hacker attacks or man-in-the-middle attacks (MITM attack) on the network node.

IoT devices (e.g. Internet-ready devices) must meet a minimum level of security criteria in order to be implemented in institutions. The devices must have update functions and the manufacturer must offer an update process. If IoT solutions (solutions relating to the Internet of Things) have insufficient or no patch management (elimination of errors), it is not possible to eliminate any vulnerabilities. As an alternative the security vulnerabilities would have to be shielded by another means. This can become very costly and can also lead the entire usage concept of an IoT device to the point of absurdity.

The teachings of the present disclosure relate in particular to the secured/authorized access to security-relevant devices installed in the building such as, for example, smoke detectors, alarming devices, actuating drives for smoke flaps, extinguishing valves etc. as if data security is jeopardized technical progress is hindered. The dissemination and introduction of IoT technology also in the building sector results in an increased security risk as regards the manipulation of installed security-relevant infrastructure. The deliberate triggering of a false alarm can therefore lead to an evacuation of a hotel which has negative consequences for the hotel and for the hotel guests, such as for example accidents during the panic. This can lead, inter alia, to ransom demands. The intended purpose can also be compromised by changes to the devices which cannot be verified (suppressing the alarm triggering of a smoke detector).

Figure 1:
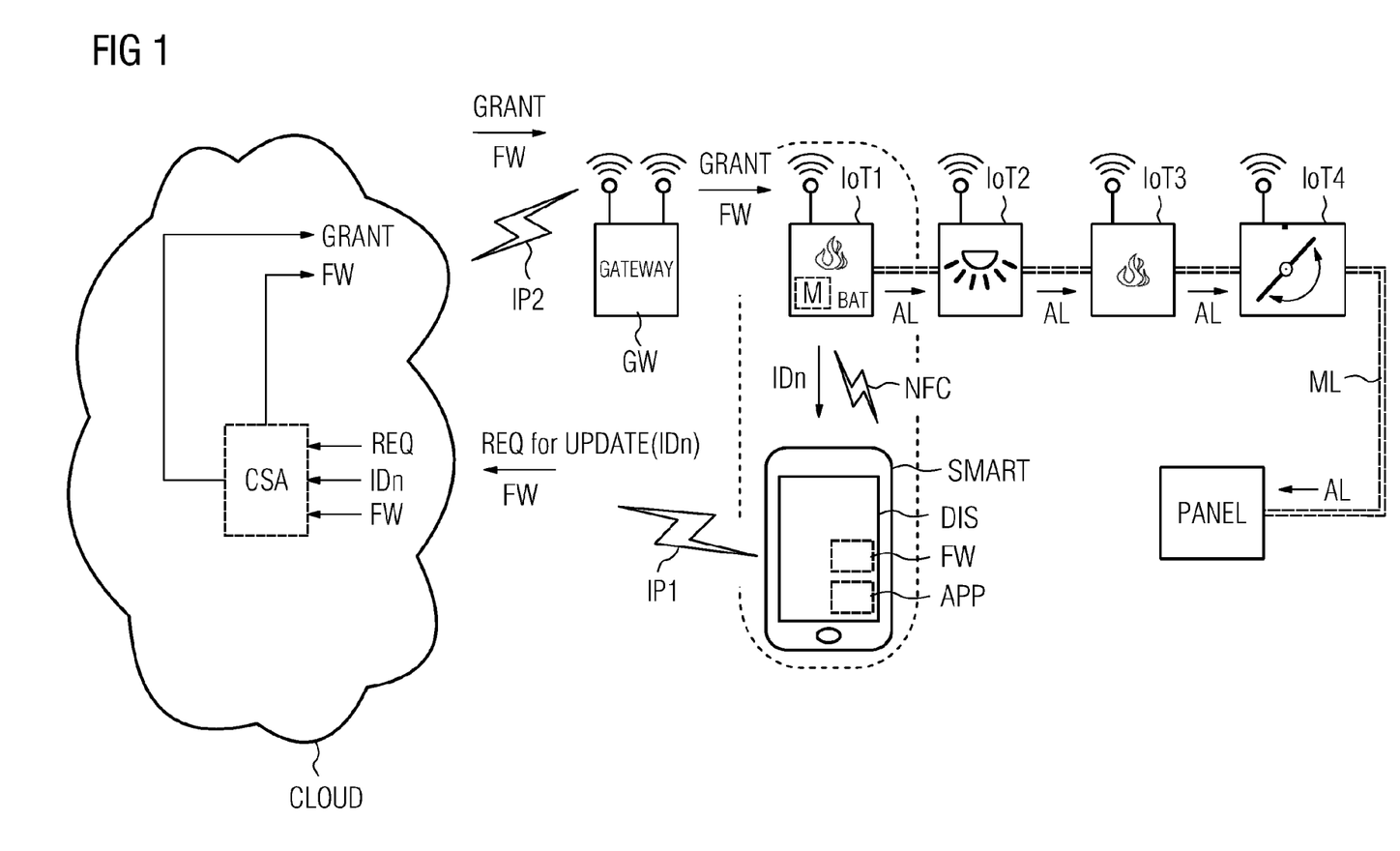
FIG. 1 shows a first exemplary system incorporating teachings of the present disclosure for authorizing the communication of a network node of a communication network.

FIG. 1 shows a first exemplary system for authorizing the communication of network nodes IoT1-IoT4 (e.g. IoT device) within a communication network IP2 (e.g. IP network), wherein a network node IoT1-IoT4 is configured in such a way that it can only carry out a communication if it receives an authorization GRANT following a completed NFC connection NFC (e.g. RFID, Bluetooth) with a defined (advantageously certified) mobile communication terminal SMART (e.g. smartphone, tablet computer, PDA (Personal Digital Assistant)). A network node IoT1-IoT4 can only then communicate with other network nodes IoT1-IoT4, cloud servers or devices (e.g. mobile communication terminals) if a mobile communication terminal SMART (e.g. smartphone, tablet computer, PDA (Personal Digital Assistant) is located in the immediate vicinity, i.e. in range for an NFC connection (e.g. at a maximum distance of 3-5 m, in particular a maximum of 3 m).

The communication network IP2 is for example an IP network which is based on an IP protocol (Internet Protocol, e.g. IPv4 or IPv6).

A network node IoT1-IoT4 may be an Internet-ready IoT device. In buildings it is, for example, correspondingly configured hazard detectors or fire detectors, or correspondingly configured operating and monitoring stations PANEL.

In some embodiments, the network node IoT1-IoT4 is configured so that following completed authorization a write access to a memory M (e.g. flash memory) of the authorized network node is permitted. The write access can take place for example via additional network nodes of the IP network IP2, and/or via the mobile communication terminal SMART, and/or via a cloud service application CSA which is located on a cloud server in a cloud infrastructure CLOUD. Write access can for example relate to a firmware update FW or an update of operating parameters of the IoT device. The network node IoT1-IoT4, PANEL may comprise an IoT device which is connected to other devices or to the Internet via an IP connection IP2.

In the exemplary system according to FIG. 1, the IoT device IoT1 only receives an authorization GRANT for a communication (e.g. firmware update FW) once the mobile communication terminal SMART has connected to the IoT device IoT1 by means of an NFC connection NFC (near-field communication, e.g. RFID (Radio Frequency Identification) or Bluetooth (e.g. BLE)). For an NFC connection the mobile communication terminal SMART must be located in the immediate spatial vicinity (e.g. within a distance of 5 m, in particular 3 m) of the device IoT1. In the representation according to FIG. 1 the spatial proximity is shown by the dashed line, within which the mobile communication terminal SMART and the IoT device IoT1 are located.

The exemplary mobile communication terminal SMART comprises a corresponding app APP for communication with a cloud service application CSA, as well as firmware FW which is to be uploaded to the device IoT1. A user (e.g. a commissioning engineer or a maintenance technician) can perform corresponding operator inputs on the display DIS of the mobile communication terminal SMART. The app APP can also be used for the legitimation or certification of the mobile communication terminal SMART.

The mobile communication terminal SMART sends a request REQ via a corresponding IP connection IP1 (Internet Protocol connection) for an update for the corresponding device IoTn to a cloud service application CSA which is realized by means of a cloud infrastructure CLOUD. The cloud service application CSA receives the request REQ, the identification IDn for the corresponding device IoTn and the firmware FW which is to be uploaded to the corresponding device IoTn. The mobile communication terminal SMART receives the identification IDn from the device IoTn by means of the NFC connection.

In the exemplary system according to FIG. 1 the cloud service application CSA receives the request REQ from the mobile communication terminal SMART via the communication connection IP1 (e.g. Internet, WLAN) for an update to be carried out (firmware update), the associated firmware FW, and the identification IDn for the device IoTn onto which the firmware FW is to be loaded. The cloud service application CSA gives an approval or authorization GRANT for a communication via the IP connection IP2 to the corresponding device IoTn. Furthermore the cloud service application CSA transmits the firmware FW to the corresponding IoT device, in the exemplary representation according to FIG. 1 to the device IoT1.

In some embodiments, the cloud service application CSA may be implemented in a correspondingly configured cloud infrastructure CLOUD, e.g. on a correspondingly configured server. The cloud service application CSA can access the IP network for the IP connection IP2 via a gateway GW or can also directly access the corresponding IoT device IoT1-

IoT4. The IP connections IP1, IP2 are advantageously radio-based connections (e.g. WLAN).

In the exemplary representation according to FIG. 1, the IoT device IoT1 is a fire detector which is connected to other devices IoT1-IoT4 via a detector line ML with a corresponding control station or fire alarm control unit PANEL (e.g. FS20 control unit). An alarm message AL can thereby be forwarded via the detector line ML from a device IoT1-IoT4 to the control unit PANEL. The network node IoT1-IoT4 may be configured in such a way that it is in a permanent NFC connection NFC with the mobile communication terminal SMART for the duration of a communication.

The network node may be configured in such a way that following completed authorization a write access to a memory M of this authorized network node is possible (e.g. via additional network nodes, the cloud service application CSA, or via the mobile communication terminal SMART). The network node may be configured in such a way that it can only carry out a communication if it receives an authorization GRANT following a completed NFC connection NFC with a defined (certified) mobile communication terminal SMART (e.g. smartphone).

Figure 2:
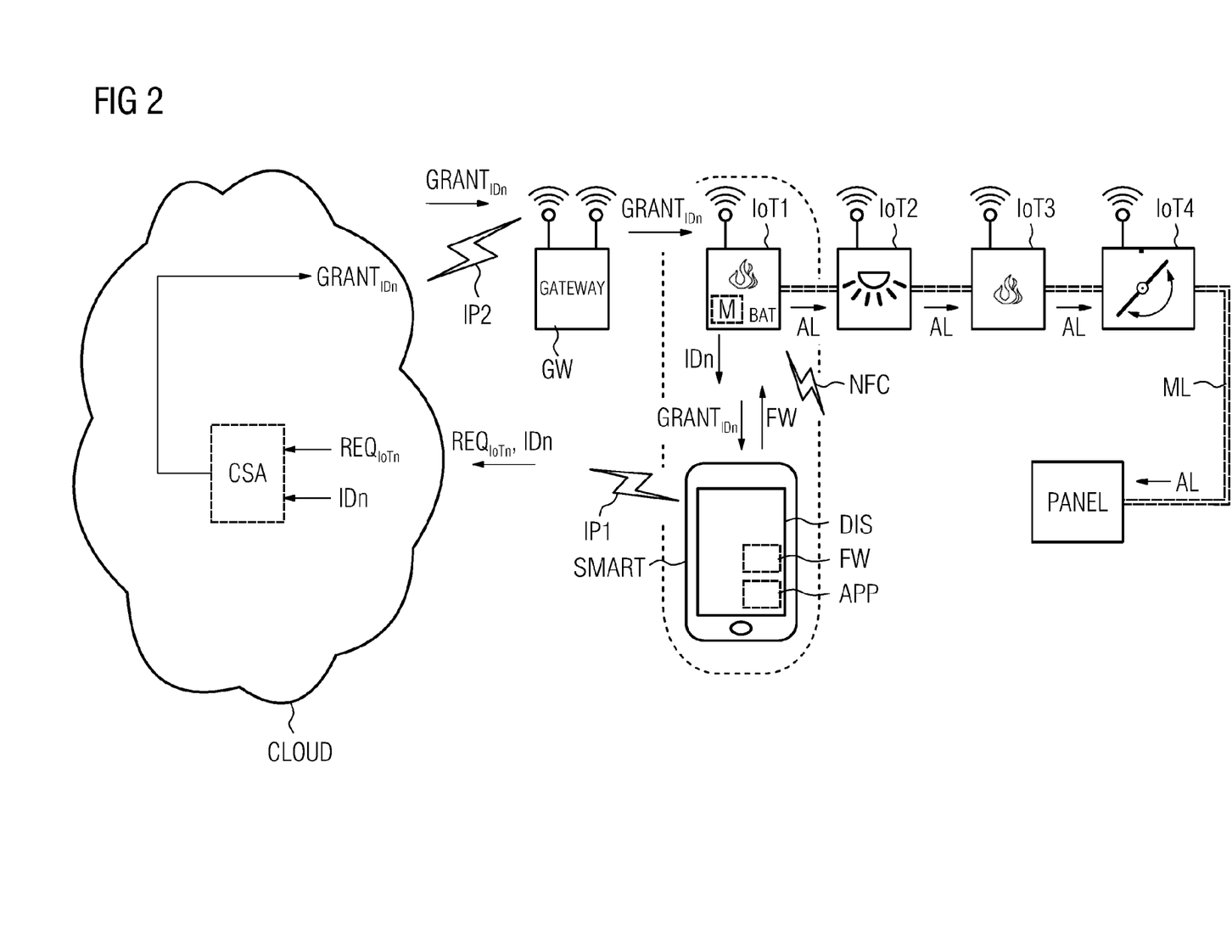
FIG. 2 shows a second exemplary system incorporating teachings of the present disclosure for authorizing the communication of a network node of a communication network.

FIG. 2 shows a second exemplary system for authorizing the communication of network nodes IoT1-IoT4 (e.g. IoT device) within a communication network IP2 (e.g. IP network), wherein a network node IoT1-IoT4 is configured in such a way that it can only carry out a communication if it receives an authorization GRANT following a completed NFC connection NFC (e.g. RFID, Bluetooth) with a defined (certified) mobile communication terminal SMART (e.g. smartphone, tablet computer, PDA (Personal Digital Assistant)). A network node IoT1-IoT4 can only then communicate with other network nodes IoT1-IoT4, cloud servers, or devices (e.g. mobile communication terminals) if a mobile communication terminal SMART (e.g. smartphone, tablet computer, PDA (Personal Digital Assistant)) is located in the immediate vicinity, i.e. in range for an NFC connection (e.g. at a maximum distance of 3-5 m, in particular a maximum of 3 m). The communication network IP2 is for example an IP network which is based on an IP protocol (Internet Protocol, e.g. IPv4 or IPv6).

A network node IoT1-IoT4 may be an Internet-ready IoT device. In buildings it is for example correspondingly configured hazard detectors or fire detectors, or correspondingly configured operating and monitoring stations PANEL. The network node IoT1-IoT4 may be configured in such a way that following completed authorization a write access to a memory M (e.g. flash memory) of the authorized network node is possible. The write access can take place for example via additional network nodes of the IP network IP2, and/or via the mobile communication terminal SMART, and/or via a cloud service application CSA which is located on a cloud server in a cloud infrastructure CLOUD. Write access can for example relate to a firmware update FW or an update of operating parameters of the IoT device.

In some embodiments, the network node IoT1-IoT4, PANEL is an IoT device which is connected to other devices or to the Internet via an IP connection IP2. In the exemplary system according to FIG. 2 the IoT device IoT1 only receives an authorization $GRANT_{IDn}$ for a communication (e.g. firmware update FW) once the mobile communication terminal SMART has connected to the IoT device IoT1 by means of an NFC connection NFC (near-field communication, e.g. RFID (Radio Frequency Identification) or Bluetooth (e.g. BLE)). For an NFC connection the mobile communication terminal SMART must be located in the immediate spatial vicinity (e.g. within a distance of 5 m, in particular 3 m) of the device IoT1. In the representation according to FIG. 2 the spatial proximity is shown by the dashed line, within which the mobile communication terminal SMART and the IoT device IoT1 are located.

The exemplary mobile communication terminal SMART comprises a corresponding app APP for communication with a cloud service application CSA, as well as firmware FW which is to be uploaded to the device IoT1. A user (e.g. a commissioning engineer or a maintenance technician) can perform corresponding operator inputs on the display DIS of the mobile communication terminal SMART. The app APP can also be used for the legitimation or certification of the mobile communication terminal SMART.

The mobile communication terminal SMART sends a request $REQ_{IoTn}$ via a corresponding IP connection IP1 (Internet Protocol connection) for an update for the corresponding device IoTn to a cloud service application CSA which is realized by means of a cloud infrastructure CLOUD. The cloud service application CSA receives the request $REQ_{IoTn}$, the identification IDn for the corresponding device IoTn onto which the firmware FW is to be uploaded. The mobile communication terminal SMART receives the identification IDn from the device IoTn by means of the NFC connection.

In the exemplary system according to FIG. 2, the cloud service application CSA receives the request REQ IoTn from the mobile communication terminal SMART via the communication connection IP1 (e.g. Internet, WLAN) for an update to be carried out (firmware update) and the identification IDn for the device IoTn onto which the firmware FW is to be loaded. The cloud service application CSA gives an approval or authorization $GRANT_{IDn}$ for a communication via the IP connection IP2 to the corresponding device IoTn. The cloud service application CSA can access the IP network for the IP connection IP2 via a gateway GW or can also directly access the corresponding IoT device IoT1-IoT4. The IP connections IP1, IP2 are advantageously radio-based connections (e.g. WLAN). The cloud service application CSA may be implemented in a correspondingly configured cloud infrastructure CLOUD, e.g. on a correspondingly configured server.

In the exemplary system according to FIG. 2, the device IoT1, once it has received the authorization $GRANT_{IDn}$ from the cloud service application CSA, sends onto the mobile communication terminal SMART with which it is in an NFC connection. Once the mobile communication terminal SMART has received the authorization $GRANT_{IDn}$ from the IoT device IoT1, the mobile communication terminal SMART sends the firmware FW to the IoT device IoT1 via the NFC connection NFC.

In the exemplary representation according to FIG. 2, the IoT device IoT1 is a fire detector which is connected to the other devices IoT1-IoT4 via a detector line ML with a corresponding control station or fire alarm control unit PANEL (e.g. FS20 control unit). An alarm message AL can thereby be forwarded via the detector line ML from a device IoT1-IoT4 to the control unit PANEL.

The network node IoT1-IoT4 may be configured in such a way that it is in a permanent NFC connection NFC with the mobile communication terminal SMART for the duration of a communication. The network node may be configured in such a way that following completed authorization a write access to a memory M of this authorized network node is permitted (e.g. via additional network nodes, the cloud service application CSA or via the mobile communication terminal SMART). The network node may be configured in such a way that it can only carry out a communication if it receives an authorization GRANT$_{IDn}$ following a completed NFC connection NFC with a defined (certified) mobile communication terminal SMART (e.g. smartphone).

Figure 3:
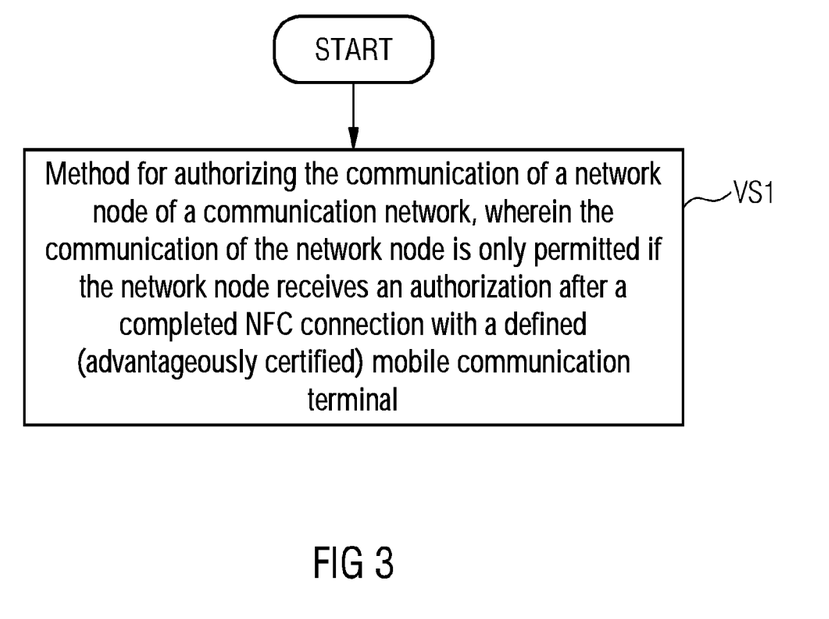
FIG. 3 shows an exemplary flow diagram for a method incorporating teachings of the present disclosure for authorizing the communication of a network node of a communication network.

FIG. 3 shows an exemplary flow diagram for a method for authorizing the communication (e.g. data connection, sending or receiving data) of a network node (e.g. IoT device) of a communication network (e.g. IP network), wherein the authorization for communication of the network node only takes place if the network node has entered into an NFC connection with a defined (advantageously certified) mobile communication terminal (e.g. smartphone). In some embodiments, prior to the communication, the network node receives the authorization via a correspondingly configured cloud server.

In some embodiments, the network node receives the authorization from the mobile communication terminal prior to the communication. To this end, the mobile communication terminal receives the authorization via a trustworthy certification server. Following receipt of the authorization, the network node requests the mobile communication terminal to send an acknowledgment to the network node via the NFC connection.

Following receipt of the authorization, the network node requests the mobile communication terminal to send an acknowledgment to a certification server via the NFC connection. In some embodiments, the network node is in a permanent (continuous, i.e. temporally uninterrupted) NFC connection with the mobile communication terminal for the duration of a communication.

In some embodiments, the mobile communication terminal receives an authorization (token, certificate; in fact authorization for authorization) from a certification server. This can take place, for example, by means of a download of a corresponding certificate from the certification server.

In some embodiments, a communication of the network node advantageously only takes place if the mobile communication terminal is located within a defined distance (e.g. 3-4 m) of the network node. In some embodiments, a write access to a memory of the authorized network node (e.g. via further network nodes or via the mobile communication terminal) only takes place following a completed authorization.

In some embodiments, the methods include:
(VS1) the communication of the network node is only permitted if the network node receives an authorization after a completed NFC connection with a defined (certified) mobile communication terminal. This method step can be realized with an infrastructure which already exists anyway in a building.

It is known that a comprehensive security strategy is required to protect an IoT infrastructure (Internet of Things). This strategy must cover the following areas: Securing data in the cloud, protecting the integrity of the data during transfer via the public Internet as well as the secure provision of devices. Each layer makes its own contribution to the security of the overall infrastructure, and the contributions build on one another and complement each other. The most serious attacks on the IoT infrastructure itself start with a direct data access to the IoT devices onsite in the direct environment of the respective IoT device.

The various embodiments of the present disclosure may prevent in particular a direct data attack from the outside on the IoT devices. In some embodiments, a data access (direct or via the server or the control unit) to the IoT device only takes place if a direct data communication with the installed IoT device with a smartphone in the immediate vicinity (approx. 2 to 3 m in the radius of the IoT device) is possible such as, for example, by means of NFC or Bluetooth.

If spatial proximity is determined via the NFC connection, the access is released so that the device can deposit external data in a secured storage area (e.g. flash memory) via a remote server or via the cloud. In some embodiments, the external data can also be transferred directly from the smartphone to the IoT device by means of NFC or Bluetooth.

In order to increase security, a request is transferred to the cloud to load external data in encrypted form to the IoT devices. The relevant device then only releases the secured storage area if the encrypted request is valid and in addition the IoT device is in a communication connection with the smartphone. The external data can then be transferred directly from the smartphone to the IoT device or via the cloud.

In some embodiments, an increased degree of security is possible for the access to the secured storage area of an IoT device. In addition to the virtual component (IP access), a physical component (location) is required to activate the data transfer. The physical access to the device can to this end further be ensured by means of access control systems. In some embodiments, the secured access to a cloud server or to a cloud service application (e.g. PKI login), it is no longer necessary in future to enter passwords or implement complicated configurations.

Some embodiments are particularly suited to applications with high security requirements and may be particularly suited to the commissioning and maintenance or the testing of IoT devices with high security requirements or in environments with high security requirements or with sensitive infrastructure (e.g. banks, prisons, protection zones, military installations, disaster response organizations, nuclear facilities, power plants). The IoT devices can, for example, be fire detectors or hazard detectors which are connected to the Internet or intranet.

| Reference characters | |
|---|---|
| REQ | Request |
| IDn | Identification (ID) |
| FW | Firmware |
| GRANT, GRANT$_{IDn}$ | Approval |
| CLOUD | Cloud infrastructure |
| CSA | Cloud service application |
| GW | Gateway |
| IoT1-IoT4 | IoT device |
| PANEL | Control and operating panel |
| ML | Detector line |
| AL | Alarm |
| BAT | Battery |
| M | Memory |
| SMART | Mobile communication terminal |
| DIS | Display |
| APP | Application program |
| IP1, IP2 | IP connection |
| NFC | Near-field communication |
| VS1 | Method step |

What is claimed is:

1. A method for authorizing communication of a network node with another component of a communication network, the method comprising:
    forming an NFC connection between the network node and a defined mobile communication terminal; and
    authorizing the network node for the communication with the other component only when a geographic position of the network node is within four meters of the position of the defined mobile communication terminal; and carrying out the communication to conduct a firmware update or an update of operating parameters of the network node;

wherein the network node and the defined mobile communication terminal are in a permanent NFC connection during the communication; and the defined mobile communication terminal includes a correspondingly certified mobile communication terminal.

2. The method as claimed in claim 1, further comprising sending authorization to the network node from the mobile communication terminal.

3. The method as claimed in claim 1, further comprising receiving authorization at the network node directly from a cloud server.

4. The method as claimed in claim 1, further comprising requesting an acknowledgement from the mobile communication terminal following receipt of authorization by the network node via the NFC connection.

5. The method as claimed in claim 1, further comprising, following receipt of authorization, requesting an acknowledgment from the mobile communication terminal via the NFC connection to a certification server.

6. The method as claimed in claim 1, further comprising receiving authorization at the mobile communication terminal via a certification server.

7. The method as claimed in claim 1, further comprising allowing communication from the network node to the communication network only if the mobile communication terminal is located within a defined distance of the network node.

8. The method as claimed in claim 1, further comprising permitting a write access to a memory of the network node only following a completed authorization.

9. A system for authorizing communication between network nodes, the system comprising:

a communication network; and a first network node;

wherein the first network node forms an NFC connection with a defined mobile communication terminal and stays in a permanent NFC connection with the defined mobile communication terminal throughout the communication;

wherein the communication network only authorizes the first network node for communication with a second network node when a geographical position of the network node is within four meters of a position of the defined mobile communication terminal;

the first network node carrying out the communication to conduct a firmware update or an update of operating parameters of the first network node; and the defined mobile communication terminal includes a correspondingly certified mobile communication terminal.

10. The system as claimed in claim 9, wherein after receiving the authorization, the network node allows a write access to a memory of the network node.

* * * * *